3,322,493
SODIUM TRIPOLYPHOSPHATE PRODUCT
Raimond Pals, Farmingdale, N.J., assignor to FMC Corporation, New York, N.Y., a corporation of Delaware
Filed Oct. 16, 1963, Ser. No. 316,642
4 Claims. (Cl. 23—106)

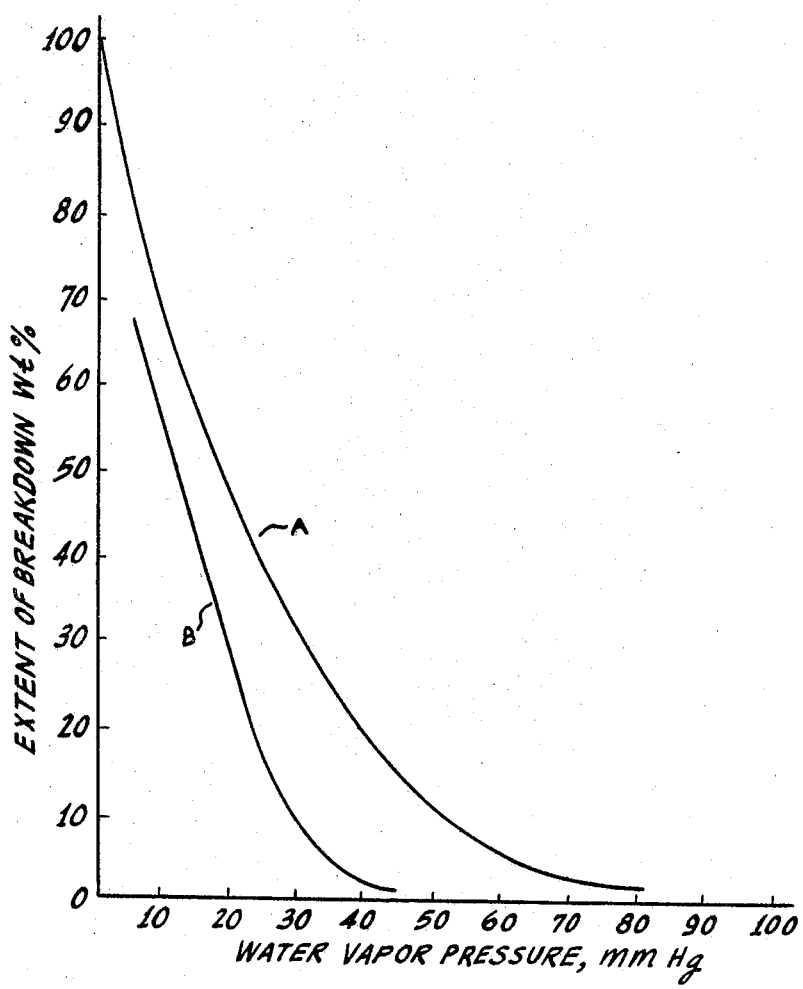

This application is a continuation-in-part of my application Ser. No. 276,304, filed on Apr. 29, 1963, entitled "Improved Sodium Tripolyphosphate Product," now abandoned.

This invention relates to a stable sodium tripolyphosphate product, and more particularly to a method for preventing the decrepitation of sodium tripolyphosphate containing at least about 17% by weight of Form I sodium tripolyphosphate.

Sodium tripolyphosphate ($Na_5P_3O_{10}$) is widely employed as the principal cleaning aid in detergent mixtures. One method for producing sodium tripolyphosphate product is to react phosphoric acid and an alkaline compound such as sodium hydroxide or sodium carbonate together in aqueous solution such that the mole ratio of sodium to phosphorus is on the order of about 1.67:1. This reaction results in the formation of an aqueous mixture containing monosodium orthophosphate and disodium orthophosphate in a mole ratio of 1:2. The free water is removed from the above phosphate solution by passing the liquid into a heating zone where it is progressively heated to a temperature of about 350° C. or higher, during which sodium tripolyphosphate is formed. The exact mole ratio of sodium to phosphorus which is employed may be varied to suit the individual needs of the producer. The ultimate reaction takes place in accordance with the following equation:

$$NaH_2PO_4 + 2Na_2HPO_4 \rightarrow Na_5P_3O_{10} + 2H_2O$$

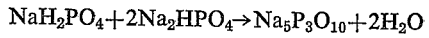

The resulting sodium tripolyphosphate which is formed is a crystalline anhydrous product, capable of having two physical forms. Form I is produced at temperatures of from about 500° to 620° C. while Form II is produced at temperatures below about 500° C. It is common to produce a sodium tripolyphosphate granular product made up of an intimate mixture of Form I and Form II by careful control of the temperature and duration of heating. The proportion of Form I and Form II is adjusted to suit the specific needs of the detergent manufacturer. The granular product that is obtained from the heating zone is cooled, milled, and bagged for shipment. The resulting granular sodium tripolyphosphate product normally has a size of about 16 to about 100 mesh (about 0.005 to 0.05 inches in diameter).

A most serious problem that has arisen with the above granular product, when the Form I content is at least about 17% by weight, is that the dense granules spontaneously decrepitate, breaking down into a fine powder during the handling and storing of this product. This decrepitation is quite distinct from particle breakdown due to crushing, impacts, or other mechanically induced breakage. The extent of decreptitation of sodium tripolyphosphate after bagging may range from about 10 to as high as 60% by weight of the sodium tripolyphosphate. In addition to decrepitation of the granules into a powder, it has also been observed that some of the granules are subject to a partial breakdown and that the bulk density of these granules is substantially altered.

This spontaneous decrepitation is serious because the detergent compounders who employ sodium tripolyphosphate set specifications on the mesh size of the granules, the bulk density of the granules and the maximum fines content which can be tolerated. If the tripolyphosphate product which is received does not meet these specifications, it cannot be employed for producing a detergent formulation having the properties desired by the detergent manufacturer. As a result, it has been observed that in many cases, sodium tripolyphosphate, which meets specifications after screening at the plant no longer meets them when ready for shipment; decrepitation of the product during subsequent handling or storage has occurred, and it no longer is acceptable.

An added difficulty is that sodium tripolyphosphate decrepitates sporadically and not in any reproducible manner. This sporadic decrepitation is not dependent upon any particular Form I content of the sodium tripolyphosphate granular product, except that at least about 17% by weight of Form I is normally required in order to have any noticeable degree of decrepitation. Decrepitation of granular sodium tripolyphosphate which consists mostly of Form I also will occur. The exact reason for decrepitation is not known and is particularly difficult to determine since even duplicate samples which have been processed exactly alike will show decrepitation in only a portion of the samples.

It is an object of the present invention to control the decrepitation of sodium tripolyphosphate so as to regulate the particle size of the final product.

It is an object of the present invention to produce sodium tripolyphosphate having a Form I content of at least about 17% by weight which does not decrepitate and result in granular breakdown and/or reduction of the bulk density of the sodium tripolyphosphate granules.

These and other objects will be apparent from the following disclosure.

I have now found that the extent of decreptitation of granular sodium tripolyphosphate, containing at least about 17% by weight Form I and formed by heating a mixture of monosodium orthophosphate and disodium orthophosphate at temperatures above about 350° C., can be controlled by regulating the water vapor content of the cooling atmosphere during that stage of the cooling operation from about 170° C. to 70° C.

More specifically, a granular sodium tripolyphosphate, containing at least about 17% by weight Form I, formed by heating a mixture of monosodium orthophosphate and disodium orthophosphate at temperatures above about 350° C., can be produced without being subject to decrepitation by cooling the hot granular sodium tripolyphosphate in an atmosphere containing water vapor in an amount sufficient to yield a partial pressure of at least about 40 mm. of Hg (and preferably at least about 60 mm. of Hg) during that stage of the cooling operation from about 170° C. to 70° C.

Additionally, a non-dusting ultra-fine powdered sodium tripolyphosphate product can be produced by substantially complete decrepitation of granular sodium tripolyphosphate containing at least about 17% by weight Form I and formed by heating a mixture of monosodium orthophosphate and disodium orthophosphate at temperatures above about 350° C., by cooling the hot granular sodium tripolyphosphate in an atmosphere free of water vapor during that stage of the cooling operation from about 170° C. to about 70° C.

It is quite unexpected to find that the extent of decrepitation depends upon the amount of water vapor which is in contact with the sodium tripolyphosphate product as it is cooling through a critical temperature stage of about 170° C. to about 70° C. The presence of water vapor in amounts over about 40 mm. of Hg (and preferably over 60 mm. of Hg) at these temperatures is critical in preventing decrepitation of the product. Virtually complete decrepitation occurs at these cooling temperatures in the absence of water vapor in the cooling atmosphere.

The relationship between granular breakdown and the amount of water vapor which is in contact with the sodium tripolyphosphate during the critical cooling temperature is illustrated in the attached drawing.

In the drawing, the extent of breakdown in terms of weight percent is plotted against the water vapor pressure in mm. of Hg; the two curves A and B are obtained by determining the extent of breakdown of two samples of sodium tripolyphosphate product at various water vapor concentrations employed during the cooling of the sodium tripolyphosphate at temperatures from 170° C. to about 70° C. The exact procedure employed is given in Example 2.

As is evident from the drawing, decrepitation can occur in widely varying amounts when the water content of the ambient atmosphere is from about 10 to about 25 mm. of Hg. This amount of water vapor is what is most frequently encountered in air streams used to cool sodium tripolyphosphate product. Thus, under normal cooling conditions, decrepitation can occur over extremely wide ranges.

When the water vapor content of the cooling atmosphere decreases and approaches zero mm. of Hg water vapor pressure, the sodium tripolyphosphate granules substantially completely decrepitate into an ultra-fine powder. This powdered sodium tripolyphosphate is predominantly —400 mesh in size, and has a very low bulk density of about 0.6 g./cc. compared with the normal 0.9 g./cc. for commercial, powdered sodium tripolyphosphate. The ultra-fine nature of this product makes it especially useful in applications where fine dispersions of tripolyphosphate are required such as in liquid detergent products. Surprisingly, this powder has been found to be non-dusty compared with normal, finely-ground sodium tripolyphosphate powder. The non-dusty character of this product is extremely desirable in applications where fine, dry powder is being transferred or mixed in detergent formulations. Further, powdered sodium tripolyphosphate of this fineness can only be obtained by expensive and prolonged ball milling of granular sodium tripolyphosphate. The present "temperature-induced milling" of granular sodium tripolyphosphate provides a quick and inexpensive process for producing ultra-fine sodium tripolyphosphate powder, by merely cooling hot granular sodium tripolyphosphate in a water vapor-free cooling atmosphere.

As the water vapor content of the cooling atmosphere increases, the sodium tripolyphosphate product exhibits increasingly less decrepitation. At water vapor pressures of about 40 mm. of Hg and above, decrepitation of the product has been considerably reduced or completely eliminated. Water vapor contents over about 60 mm. of Hg substantially eliminate all decrepitation of the granular product. Increasing the water vapor content substantially over 60 mm. of Hg does not render sodium tripolyphosphate product any more resistant to decrepitation. Rather, it is helpful only in assuring that the required amount of humidity (at least 60 mm. of water vapor) is present in the ambient atmosphere to completely eliminate decrepitation during the critical cooling temperatures, thereby yielding a stable granular product.

In carrying out the present invention, sodium tripolyphosphate is produced by the conventional method of passing an aqueous mixture containing monosodium orthophosphate and disodium orthophosphate in a mole ratio of about 1:2 through a heated zone to remove free water. The resultant mixture is then progressively heated to a temperature of about 350° C. during which Form II sodium tripolyphosphate is formed. A granular sodium tripolyphosphate product having a substantial portion of Form I, is produced by employing a rotary kiln in the final stages of heating at temperatures on the order of about 500° C. or above. The extent of the conversion of Form II to Form I depends upon the temperature which is employed and the duration of heating at these temperatures.

The resultant product, having at least 17% by weight Form I, is removed from the kiln at temperatures on the order of about 500° C., and is ground and screened to obtain a product having a mesh size of about 16 to about 100 and a density of about 0.85 to about 1.05 g/cc. The grinding and screening process can be done before the material is cooled to about 170° C. or after the material has been cooled to about 70° C. In either case, the product should enter a control cooling zone by the time the temperature has dropped to 170° C.

The cooling zone can be a rolling drum similar to a rotary kiln, in which the product is tumbled within the drum while a current of cool air is passed through the drum to cool the sodium tripolyphosphate granules. The water vapor content of the cooling zone is increased by injecting water vapor (steam) into the gas stream in amounts sufficient to raise the water vapor content of the atmosphere in the rotary drum to preferably about 60 mm. of Hg or above. In addition to a rotary cooler, it is perfectly feasible to employ a fluid bed cooler or any other heat exchange equipment for cooling the sodium tripolyphosphate product, provided the humidity level of the ambient air stream in contact with the sodium tripolyphosphate can be controlled.

It is mandatory that the sodium tripolyphosphate granules be placed in the cooler at temperatures above about 170° C. and that the cooling stage between 170° C. to 70° C. be carried out in the presence of controlled amounts of water vapor. The sodium tripolyphosphate granules can be placed in the cooler directly from the kiln at temperatures of about 500° C.; they can also be pre-cooled to any temperature above 170° C. before being fed to the cooler, the most convenient temperature being fixed by the plant procedure.

The rate at which cooling is effected appears to have only a slight effect on the present method for preventing decrepitation. If the temperature of the cooling atmosphere is about 40° C. or below, water vapor pressures of about 40 mm. of Hg or above have been found sufficient to stop any substantial decrepitation; if the cooling atmosphere is between 50–70° C., higher water vapor pressures (on the order of 60 mm. of Hg or above) have been found necessary to stop substantial decrepitation. Further, while cooling aids such as air streams and agitation means such as fluid beds and rotary drums are helpful in promoting cooling, these are not necessary in the present process. If desired, cooling can be effected in static manner, provided that the water vapor content of the ambient air stream surrounding the sodium tripolyphosphate granules is carefully controlled during cooling through the critical temperatures. Where complete decrepitation of the granules is desired to produce the ultra-fine sodium tripolyphosphate powder, static cooling in an air-tight container is the preferred procedure.

The following examples are given to illustrate the present invention but are not deemed to be limitative thereof.

*Example 1.—Preparation of sodium tripolyphosphate*

Sodium tripolyphosphate was prepared by a typical commercial rotary dryer process in which soda ash and phosphoric acid were added to water in sufficient quantities that the final solution had a mole ratio of Na/P of about 1.67/1 and a density of 55° Bé. The heat of reaction was sufficient to increase the temperature of the solution to about 100° C. and drive off most of the carbon dioxide formed. The resulting solution was fed to a dryer to remove the free water and the dry orthophosphate salts were further heated by exposure to hot gases within a rotary kiln till the temperature of the product was about 500–520° C. The product was then removed from the kiln, partially cooled, reduced in size and passed over screens to separate the desired granular fraction.

*Example 2.—Process of the invention*

Samples of sodium tripolyphosphate were produced as set forth in Example 1 and were permitted to cool. Those that did not break down, i.e. decrepitate, were separated into two screen fractions, −4+8 and −8+16 mesh. These fractions were placed in a muffle furnace and heated for one hour at 500° C. to increase the Form I content to about 75%. These samples were then permitted to cool on screen supports under a variety of conditions. One sample of each mesh fraction was permitted to cool under atmospheric conditions (11 mm. of Hg humidity). The −4+8 mesh fraction decrepitated 76% while the −8+16 mesh fraction decrepitated 74%. The remainder of the samples were precooled to 170° C. under atmospheric conditions and then placed in a constant humidity cabinet maintained at 50° C. The water vapor pressure of the atmosphere in the cabinet was maintained at 0, 28, 40, 64 and 82 mm. of Hg respectively, during cooling of the various samples from 170° C. to 70° C. The extent of breakdown of the samples when they reached 70° C. was determined and plotted against the humidity of the cooling atmosphere. These results are reported in graphic form as Curve A in the drawing. As can be seen from the drawing, the product is substantially free of decrepitation at water vapor contents above about 60 mm. of Hg.

A second set of samples were treated in the same manner, except that the humidity cabinet was maintained at 40° C. and the water vapor pressures of the humidity cabinet was 25, 30, 32, 38 and 44 mm. of Hg. The results are reported graphically as Curve B. In this case, the product is substantially free of decrepitation at water vapor contents above about 40 mm. of Hg.

*Example 3*

Run A.—Sodium tripolyphosphate samples were prepared as described in Example 1, except that the rotary kiln temperature was maintained at 480° C. to make only Form II product. These were cooled to room temperature under atmospheric conditions without decrepitation. The product was crushed and a −8+100 mesh fraction removed and heated to 514° C. in a batch rotary kiln to increase the Form I content to 26%. The resultant product was cooled within a rotary dryer by means of cooling air being passed over the granular product. The water vapor content of the cooling air was about 10 mm. of Hg. and the product was cooled to room temperature in about an hour. Upon analysis, it was found that about 62% of the product decrepitated to a fine powder which passed through a 100 mesh sieve.

Run B.—The procedure described in Run A was duplicated except that when the sample reached 170° C., the water vapor pressure of the cooling air was maintained at 100 mm. of Hg. Upon cooling, this sample exhibited no decrepitation or granular breakdown.

*Example 4*

Example 3 was repeated with sodium tripolyphosphate samples containing 17% Form I and 30% Form I. The results obtained showed decrepitation in samples of both 17% and 30% Form I when cooled with air containing 11 mm. of Hg; no decrepitation occurred when duplicate samples were cooled with air containing 100 mm. of Hg.

*Example 5*

Samples of hot granular sodium tripolyphosphate were produced as set forth in Example 1 and were removed from the discharge end of the rotary kiln at a temperature of about 520° C. The samples, which contained about 60% Form I, were transferred into containers which were then sealed. The atmosphere within the sealed containers contained essentially no water vapor. The samples were introduced into the containers at a temperature of about 440° C. and were allowed to cool to 50° C. in the sealed containers. During the cooling, the samples decrepitated to the extent of about 97% by weight and formed an ultra-fine product which was sufficiently fine to pass through a 400-mesh sieve. The resulting powder had a bulk density of about 0.6 g./cc. and was found to be completely non-dusty in character.

*Example 6*

Samples of sodium tripolyphosphate (−8+16 mesh) obtained as described in Example 2 were heated in a muffle furnace for 1.5 hours at 500° C. to increase the Form I content to about 75%. The samples were then placed in dry containers and sealed and then cooled to 50° C. The atmosphere in the sealed containers was substantially free of water vapor. During the cooling, the samples decrepitated to the extent of about 97%, forming an ultrafine powder which could pass through a 400-mesh sieve. The powder was non-dusty in character and had a bulk density of about 0.6 g./cc.

*Example 7*

Samples of sodium tripolyphosphate were produced as set forth in Example 1. The samples, having a size of −20+100 mesh, were heated in a muffle furnace for ½ hour at 520° C. to increase the Form I content to about 70%. The samples were then placed in a vacuum desiccator and allowed to cool under reduced pressure and in an essentially anhydrous atmosphere to about 50° C. During this cooling, the samples decrepitated to the extent of 99% by weight into an ultra-fine powder which was non-dusty in character and which had a bulk density of 0.6 g./cc.

Pursuant to the requirements of the Patent Statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:
1. A process for producing granular sodium tripolyphosphate containing at least about 17% by weight Form I sodium tripolyphosphate, which is formed by heating a mixture of monosodium orthophosphate and disodium orthophosphate at temperatures above about 350° C. which is not subject to decrepitation, comprising cooling said hot granular sodium tripolyphosphate in an atmosphere containing water vapor in an amount sufficient to yield a partial pressure of at least about 40 mm. of Hg, during that stage of the cooling operation from about 170° C. to 70° C.

2. Process of claim 1 in which the partial pressure of the water vapor is at least 60 mm. of Hg.

3. Process of claim 1 in which the sodium tripolyphosphate is heated to temperatures of about 500° C.

4. Process of claim 1 in which the Form I content of sodium tripolyphosphate is from about 17% to about 76%.

References Cited

UNITED STATES PATENTS

| | | | |
|---|---|---|---|
| 2,630,372 | 3/1953 | Wright | 23—106 |
| 2,916,354 | 12/1959 | Edwards | 23—106 |
| 3,054,656 | 9/1962 | Cassidy et al. | 23—106 |
| 3,210,154 | 10/1965 | Klein et al. | 23—106 |

OSCAR R. VERTIZ, *Primary Examiner.*

O. F. CRUTCHFIELD, *Assistant Examiner.*